(12) United States Patent
Iadanza (10) Patent No.: US 7,313,178 B2
(45) Date of Patent: Dec. 25, 2007

(54) TRANSCEIVER FOR RECEIVING AND TRANSMITTING DATA OVER A NETWORK AND METHOD FOR TESTING THE SAME

(75) Inventor: Joseph A. Iadanza, Hinesburg, VT (US)

(73) Assignee: International Business Machines Corporation, Armonk, NY (US)

( * ) Notice: Subject to any disclaimer, the term of this patent is extended or adjusted under 35 U.S.C. 154(b) by 986 days.

(21) Appl. No.: 10/063,316

(22) Filed: Apr. 10, 2002

(65) Prior Publication Data

US 2003/0193996 A1    Oct. 16, 2003

(51) Int. Cl.
H04B 3/46    (2006.01)

(52) U.S. Cl. .................. 375/224; 375/219; 714/30; 714/799

(58) Field of Classification Search ........... 702/120, 702/69, 71, 72, 75, 78, 79, 106, 107, 122, 702/124–126, 189, 176–178; 714/814–815, 714/724, 731, 819, 744, 715, 821, 733, 738, 714/739, 704, 703, 799, 30; 375/224–227, 375/371, 219, 229, 221, 220, 222, 377, 213; 708/250, 252; 370/249, 366, 506, 214, 245

See application file for complete search history.

(56) References Cited

U.S. PATENT DOCUMENTS

| | | | | |
|---|---|---|---|---|
| 4,754,216 A * | 6/1988 | Wong | ...................... | 324/76.82 |
| 5,248,905 A * | 9/1993 | Kuo | ........................... | 327/203 |
| 5,373,316 A | 12/1994 | Ishinabe et al. | | |
| 5,402,440 A | 3/1995 | Marbot | | |
| 5,648,972 A | 7/1997 | Gharakhanian | | |
| 5,676,558 A | 10/1997 | Mayer | | |
| 5,737,342 A * | 4/1998 | Ziperovich | .................. | 714/736 |
| 5,787,114 A * | 7/1998 | Ramamurthy et al. | ...... | 375/221 |
| 6,076,175 A * | 6/2000 | Drost et al. | ................. | 714/704 |
| 6,087,869 A * | 7/2000 | Ohishi et al. | ............... | 327/156 |
| 6,201,829 B1 * | 3/2001 | Schneider | ................... | 375/221 |
| 6,236,697 B1 * | 5/2001 | Fang | .......................... | 375/376 |
| 6,298,458 B1 * | 10/2001 | Cranford et al. | ........... | 714/716 |
| 6,564,349 B1 * | 5/2003 | Mitten et al. | ............... | 714/733 |
| 6,625,560 B1 * | 9/2003 | Molla et al. | ................ | 702/120 |
| 6,661,266 B1 * | 12/2003 | Variyam et al. | ............ | 327/159 |

* cited by examiner

Primary Examiner—Mohammed Ghayour
Assistant Examiner—Sophia Vlahos
(74) Attorney, Agent, or Firm—Richard A. Henkler; Hoffman, Warnick & D'Alessandro LLC (57) ABSTRACT

The present invention provides a transceiver for receiving and transmitting data over a network, and a method for testing the same. In particular, the present invention provides a physical layer transceiver having a built-in-self-test (BIST) device that allows for, among other things, pulse density/width variation and jitter control.

18 Claims, 8 Drawing Sheets

TRANSCEIVER FOR RECEIVING AND TRANSMITTING DATA OVER A NETWORK AND METHOD FOR TESTING THE SAME

BACKGROUND OF THE INVENTION

1. Field of the Invention

The present invention provides a transceiver for receiving and transmitting data over a network, and a method for testing the same. Specifically, the present invention provides a physical layer transceiver having a built-in-self-test (BIST) device that allows for variation of a pulse density/width of a network data signal, and offset variation of a reference clock signal for improved testing of the transceiver.

2. Background Art

Physical layer transceiver circuits are commonly used in network (e.g., LAN) communication applications. As known in the art, transceivers are devices that typically include digital logic, an analog receiver for receiving network data and an analog transmitter for transmitting network data. Due to their relatively simple design, it was easy to test early stage transceivers. Specifically, the digital logic was tested via Level-Sensitive Scan Design (LSSD) techniques, the transmitter was tested through a series of DC parametric measurements, while the receiver was tested through a latched receiver test. Various methods of testing transceivers are generally shown in U.S. Pat. Nos. 5,337,316, 5,402,440, 5,648,972 and 5,676,588.

As transceivers have become more complex, however, accurate and inexpensive ways to test the transceivers have become scarce. In particular, the complexity of the receiver portion of the transceivers have typically grown at a rate faster than the digital logic or the transmitter portions. Thus, while the logic and transmitter portions can continue to be tested via LSSD and parametric procedures, the receivers require more complex testing measures.

Heretofore, attempts have been made to provide improved testing procedures for such transceivers. One such attempt is shown in U.S. Pat. No. 6,298,458 to Cranford et al, herein incorporated by reference. In Cranford et al., a built-in-self-test (BIST) device was provided to provide improved transceiver testing. Specifically, the BIST device generated both a data signal representative of data being transmitted over a network, and a control signal for impairing characteristics of the data signal. The data signal and control signal were passed to the transmitter, which generated an output signal having data according to the data signal and impaired characteristics according to the control signal. The output signal was then forwarded to the receiver, which attempted to reconstruct the original data signal. By analyzing the reconstructed data signal, the BIST device could detect erroneous performance by the transceiver.

The BIST device of Cranford et al. allows for basic functions of the transceiver to be tested by mimicking simple problems such as elongated transit paths and signal slurring. However, system level problems such as control over the signal outputted to the receiver and reference clock signal jitter could not be tested. Specifically, controlling the pulse density/width of the data signal outputted to the receiver allows for a more thorough test (e.g., clock recovery) of the transceiver to be performed. Moreover, by varying the offset of the reference clock signal, the capability of the transceiver to accommodate jitter can be tested.

In view of the foregoing, there exists a need for a transceiver for receiving and transmitting data over a network. Moreover, a need exists for a method for testing such a transceiver. Still yet, a need exists for a transceiver having an improved BIST device that allows for variation of pulse density/width of a network data signal, and offset variation of the reference clock signal embedded within the network data signal.

BRIEF SUMMARY OF THE INVENTION

The present invention overcomes the drawbacks of previous devices by providing a transceiver for receiving and transmitting data over a network, and a method for testing the same. Specifically, the transceiver of the present invention includes a built-in-self-test (BIST) device. The BIST device of the present invention allows, among other things, offset variation of a reference clock signal (referred to herein as jitter) and variation of a pulse density/width of a network data signal. The capability to vary the offset and pulse density provide for improved testing of the transceiver.

According to a first aspect of the present invention, a transceiver for receiving and transmitting data over a network is provided. The transceiver comprises: (1) a transmitter for receiving a network data signal representative of a signal capable of being transmitted over a network and a control signal for impairing characteristics of the network data signal, and for continuously generating an output signal corresponding to the data signal and the control signal during a predetermined time window; (2) a receiver for continuously receiving the output signal from the transmitter, and for reconstructing the network data signal within the predetermined time window; and (3) a built-in-self-test (BIST) device for generating the network data signal, the control signal, and for providing a clock signal for jitter testing of the network data signal, wherein the BIST device detects erroneous performance by the transceiver based on the reconstructed network data signal.

According to a second aspect of the present invention, a transceiver for receiving and transmitting data over a network is provided. The transceiver comprises: (1) a transmitter for receiving a network data signal representative of a signal capable of being transmitted over a network and a control signal for impairing characteristics of the network data signal, and for continuously generating an output signal corresponding to the data signal and the control signal during a predetermined time window; (2) a receiver for continuously receiving the output signal from the transmitter, and for reconstructing the network data signal within the predetermined time window; and (3) a built-in-self-test (BIST) device for generating the network data signal and the control signal, and for varying a pulse width of the network data signal, wherein the BIST device comprises means for detecting erroneous performance by the transceiver based on the reconstructed network data signal.

According to a third aspect of the present invention, a method for testing performance of a transceiver for receiving and transmitting data over a network is provided. The method comprises the steps of: (1) generating a network data signal representative of signals capable of being transmitted over a network, and generating a control signal for impairing characteristics of the network data signal; (2) varying a pulse width of the network data signal; (3) varying an offset of a clock signal embedded within the network data signal; (4) a transmitter component of the transceiver device receiving the network data signal and the control signal and generating an output signal corresponding to the network data signal and having an impaired characteristic according to the control signal, the output signal being generated continuously during a predetermined time window; (5) a receiver component of the transceiver device continuously receiving the output signal from the transmitter component and reconstructing the network data signal within the predetermined time window; and (6) detecting erroneous performance by the transceiver based on the reconstructed data signal.

According to a fourth aspect of the present invention, a program product stored on a recordable medium for testing a transceiver device is provided. When executed, the program product comprises: (1) program code for generating a network data signal representative of data capable of being transmitted over a network by a transceiver device and for generating a control signal for impairing characteristics of the network data signal; (2) program code for varying a pulse width of the network data signal; (3) program code for varying an offset of a clock signal embedded within the network data signal; (4) program code for enabling a transmitter component of the transceiver device to receive said network data signal and the control signal, and for generating an output signal corresponding to the network data signal having an impaired characteristic according to the control signal, wherein the output signal is generated continuously during a predetermined time window; (5) program code for enabling a receiver component of the transceiver device to continuously receive the output signal from the transmitter component and for reconstructing the network data signal within the predetermined time window; and (6) program code for detecting erroneous performance by the transceiver device based on the reconstructed network data signal.

Therefore, the present invention provides a transceiver for receiving and transmitting data over a network, and a method for testing the same.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

In general, the present invention provides a physical layer transceiver for receiving and transmitting data over a network, and a method for testing the same. Specifically, the present invention provides a transceiver having an improved built-in-self-test (BIST) device for improved testing of the transceiver. As indicated above, U.S. Pat. No. 6,298,458 (herein incorporated by reference) provides a BIST device for testing of a transceiver. The present invention provides an improved BIST device that not only includes the features and functions of the BIST device shown in U.S. Pat. No. 6,298,458, but also provides pulse density/width variation of a network data signal and offset variation of a reference clock signal (also referred to as jitter or duty cycle distortion).

Figure 1:
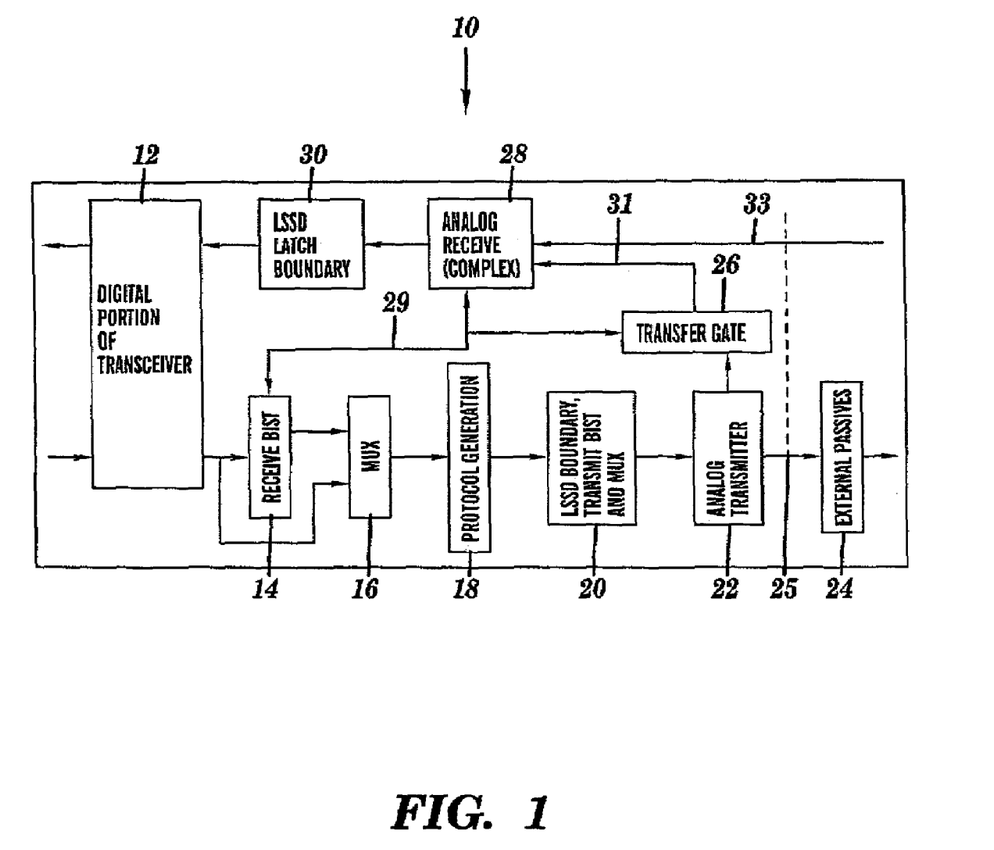
FIG. 1 depicts a high level flow diagram of the present invention.

Referring now to FIG. 1, a single chip transceiver 10 according to the present invention is shown. As shown, transceiver 10 includes a digital domain portion 12, an analog transmitter 22 and an analog receiver 28. Transceiver 10 also includes a BIST device having two components, receiver BIST 14 and transmitter BIST 20 (shown packaged with LSSD latch boundaries). In addition to the new features described below, receiver BIST 14 and transmitter BIST 20 also have functions and features similar to those described in U.S. Pat. No. 6,298,458. For example, receiver BIST 14: (1) provides alternative, programmable data to protocol generator 18; (2) controls the adaptation setup of receiver 28 (thereby bypassing adaptation convergence); (3) and speeds test and compression of the data received at the receiver port. Moreover, receiver BIST 14 also may assert control over protocol generator 18 to disable scrambling methodology present in some transceivers 10. Unlike previous BIST devices, however, transmitter BIST 20 includes a jitter control system and a pulse width counter system (as will be further described below). These added components provide improved testing by allowing for system level problems to be mimicked. Specifically, the jitter control system allows for an offset of a reference clock signal to be varied, while the pulse width counter system allows the pulse density/width of a network data signal to be varied.

As further shown in FIG. 1, transceiver 10 also includes LSSD latch boundaries 20 (shown packaged with transmitter BIST) and 30. LSSD latch boundaries 20 and 30 isolate digital portion 12 from transmitter 22 and receiver 28, and provide LSSD testing of digital portion 12. As known, digital portion 12 covers all digital functions including the digital adaptation circuitry. Mux 16 provides a multiplexor function for receiving signals from receiver BIST 14 and digital portion 12, while protocol generator 18 generates specific signals in accordance with a particular transmit communications protocol (e.g., MLT3, Manchester, etc.). External passive devices 24 could also be provided to convert transmitter 22 output from a current to a voltage, which is then transmitted to receiver 28 via transfer gate 26. Also, although not shown, network connections beyond external passive device 24 could be implemented.

In general, to test transceiver 10, transmitter BIST 20 will generate a network data signal representative of data being transmitted over a network, and a control signal. The control signal will impair various characteristics of the network data signal. For example, the control signal could distort the network data signal, or impair the strength, phase or amplitude thereof. Under the present invention, transmitter BIST 20 will also provide improved testing by varying a pulse density/width of the generated network data control signal, and/or by varying an offset of a reference clock signal embedded within the network data signal (also know as jitter or duty cycle distortion). Transmitter 22 will receive the generated network data signal and control signal, and generate a single output signal. The output signal will have the data of the network data signal and the impaired characteristics provided in the control signal. The output signal will be routed to receiver 28, which will reconstruct the original network data signal. Based on the reconstructed network data signal, receiver BIST 14 can detect erroneous performance by transceiver 10.

Figure 2:
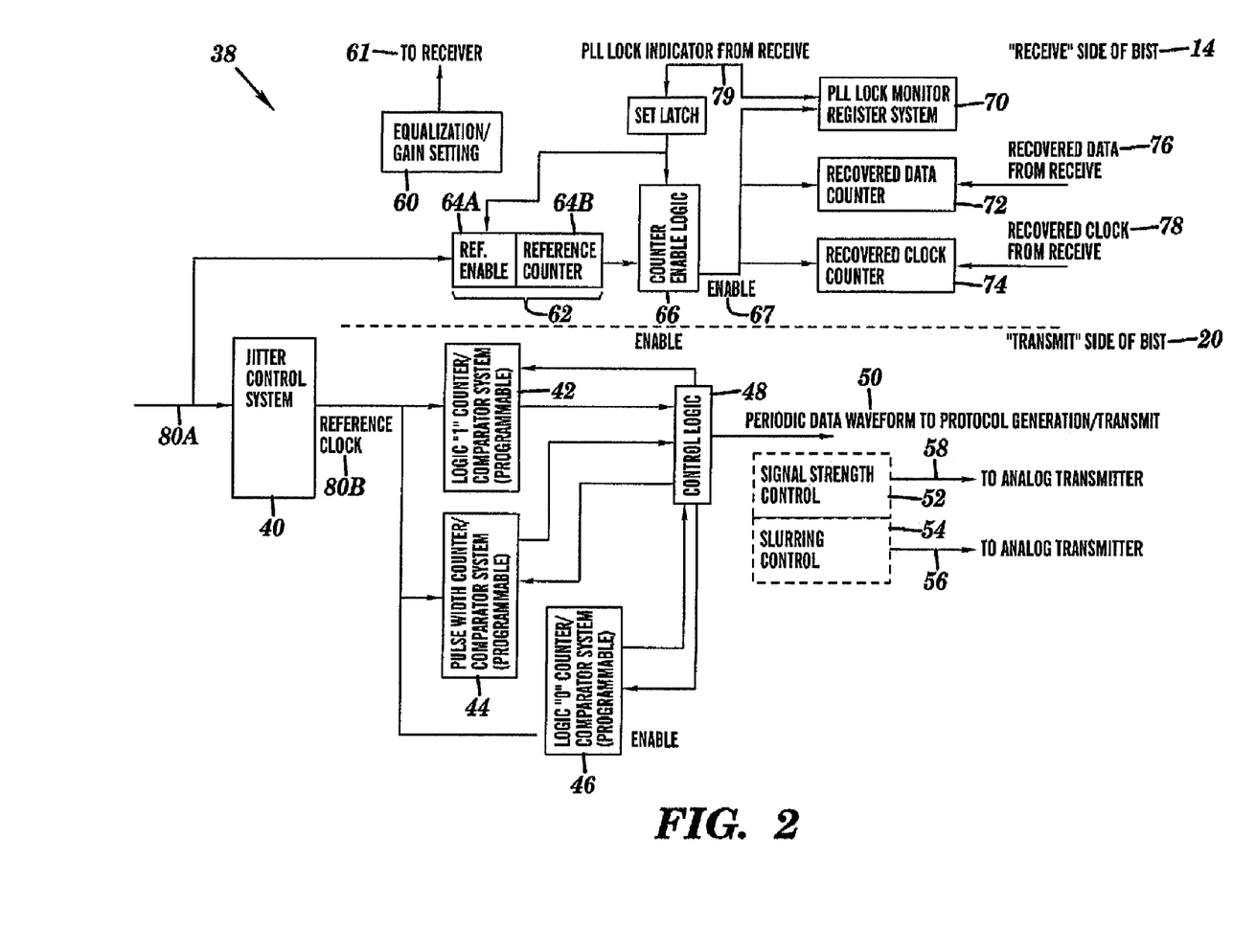
FIG. 2 depicts a block diagram of the operation of the BIST device of the present invention.
Figure 3A:
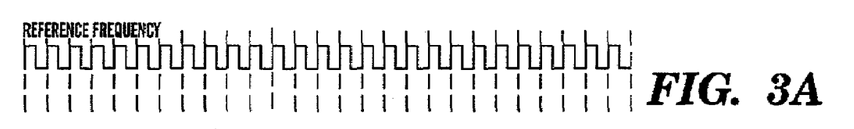
FIGS. 3A-3H depict example waveforms for a 100Tx test configuration without jitter or pulse density/width variation.
Figure 3B:
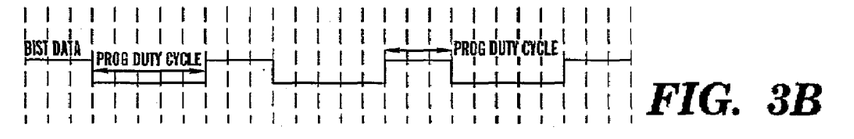
Figure 3C:
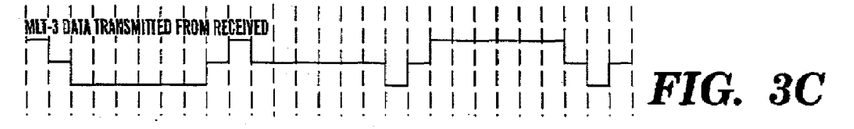
Figure 3D:
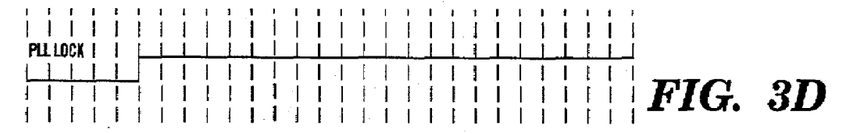
Figure 3E:
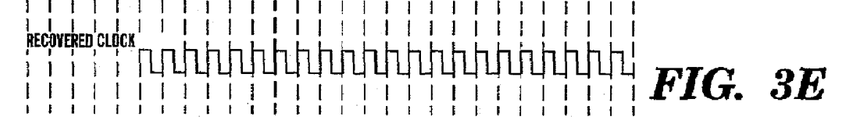
Figure 3F:
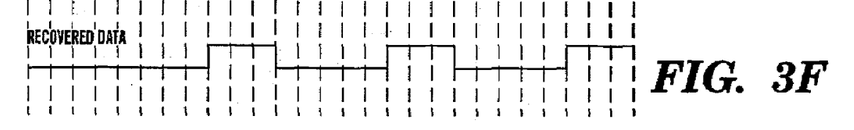
Figure 3G:
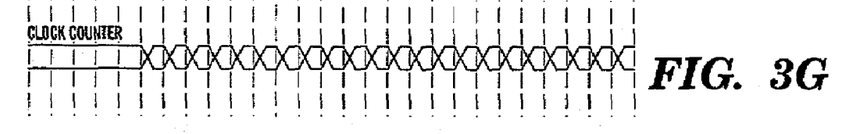
Figure 3H:
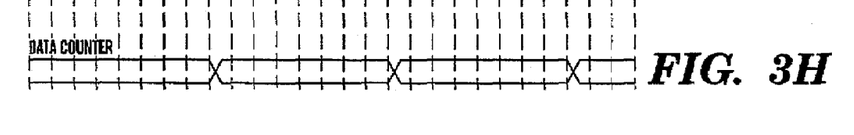

Referring now to FIG. 2, receiver BIST 14 and transmitter BIST 20 are shown in greater detail. It should be understood that for clarity purposes, receiver BIST 14 and transmitter BIST 20 are collectively referred to as BIST device 38. It should also be understood that with the exception of newly added jitter control system 40 and pulse width counter 44, BIST device 38 of the present invention could function similarly to the BIST device shown in U.S. Pat. No. 6,298,458. When functioning as such, BIST device 38 could produce the waveforms shown in FIGS. 3A-3H.

As indicated above, BIST device 38 of the present invention includes components not previously known. Specifically, BIST device 38 jitter control system 40 and pulse width counter 44, which will be further described below. In its basic operation, transmitter BIST 20 will generate periodic network data patterns for transmission to receiver 28 without connectivity to the edge of the chip in which transceiver 10 is embedded. Receiver BIST 14 provides for the testing of analog receiver 28.

Figure 4A:
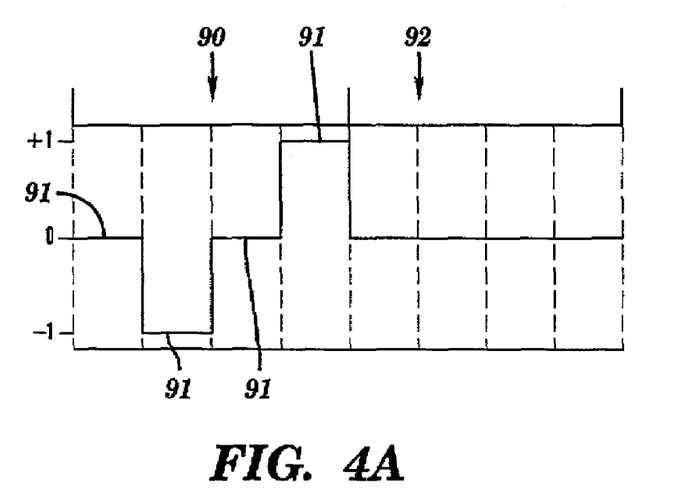
FIG. 4A depicts an example network data signal waveform under the present invention.

With regard to transmitter BIST 20, a sequential data bitstream(s) (i.e., network data signal) is generated for input to transmitter 22 at the nominal data rate for producing the proper frequency to be fed to the receiver 28 of transceiver 10. Two independent programmable "1's" and "0's" counter/comparator systems 42 and 46 are respectively coupled with BIST control logic circuitry 48 to enable programming and alteration of both the digital data "frequency" and data "duty cycle" of the digital data signal 50 to be transmitted to the protocol generator 18, as shown in FIGS. 1 and 2. Specifically, logic counter 42 allows for designation of a quantity of pulses in the generated network data signal. Conversely, logic counter 46 allows for designation of a quantity of data widths during which the network data signal will be quiescent (non-pulsing). Pulse width counter 44 allows for designation of a quantity of bit times for each pulse designated via logic counter 42. Specifically, pulse width counter 44 allows for designation of a width for the pulses in the generated network data signal. By designating a higher bit time per pulse via pulse width counter 44, each pulse width will be increased, and the overall pulse density will be decreased. Previous devices lacking pulse width counter 44 set a default of one bit time per pulse. Thus, if logic counter 42 was set to four, then four pulses each having a width of one bit time were generated (as shown in FIG. 4A). Such designs made it difficult to test transceiver performance in an area such as clock recovery.

Figure 4B:
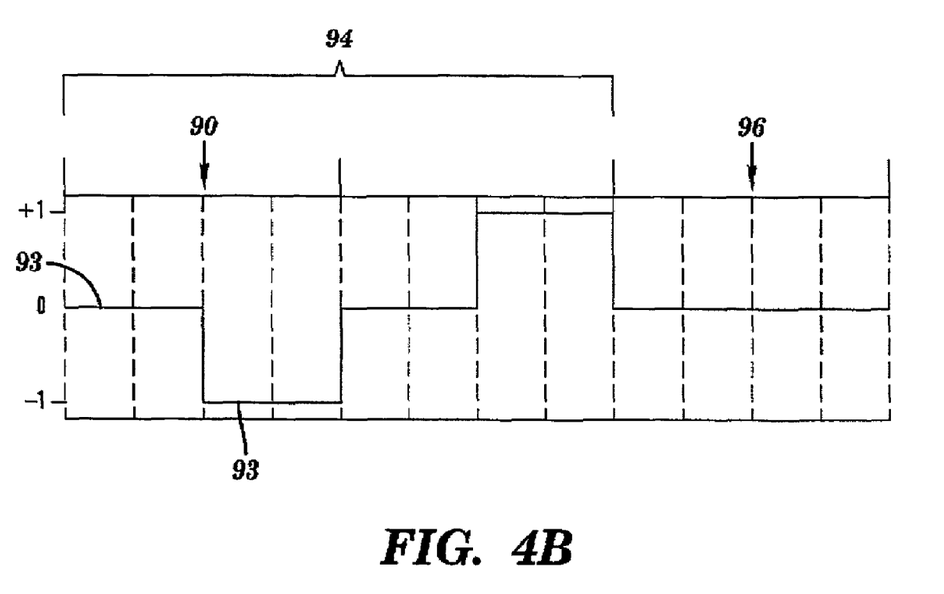
FIG. 4B depicts the waveform of FIG. 4A as modified by a pulse width counter system of the present invention.

Referring to FIGS. 4A and 4B, the function of pulse width counter 44 can be seen in greater detail. FIG. 4A shows a waveform of a network data signal that is pulsing for four bits times 90 and quiescent for four bit times 92 for a total pattern of eight bit times. To obtain such a waveform, logic counters 42 and 46 are both set to four. As shown in FIG. 4A, the pulses (i.e., during bit times 90) all have a pulse width of one bit time, which is the default as provided under previous devices. Conversely, the waveform of FIG. 4B has four pulses that are pulsing for a total of eight bit times 94 while being quiescent for four bit times 96. This functionality is provided by pulse width counter 44. Specifically, the four pulses and four bit times 96 of quiescence are designated by setting logic counters 42 and 46, respectively, to four. Then, the designated four pulses in bit time range 94 are programmed to traverse eight bit times by setting pulse width counter 44 to two. That is, each pulse designated via logic counter 42 (e.g., 4) will span the number of bit times designated via pulse width counter 44 (e.g., 2). Accordingly, the pulsing portion of the waveform shown in FIG. 4B traverses eight bit times (e.g., 4×2).

By increasing the number of bit times each pulse traverses, overall pulse density is reduced compared to the waveform of FIG. 4A. This capability allows for better testing of transceiver 10 by providing more realistic MLT3 data as well as an added degree of freedom in clock recovery tests. With respect to the latter, the increase in pulse width makes clock recovery harder for transceiver 10 because clock recovery relies upon counting edges in pulses. The more edges there are in a particular range of bit times, the easier clock recovery becomes. Accordingly, by increasing the number of bit times the pulses traverse, the fewer edges there are to be counted in a particular bit time range. For example, FIG. 4A shows four pulse edges 91 in bit time range 90. Conversely, the same range 90 in FIG. 4B shows only two edges 93.

Referring back to FIG. 2, logic counters 42 and 46 and pulse width counter 44 receive reference clock signal 80B from jitter control system 40, which provides for varied offset of reference clock signal 80A. Specifically, jitter control system 40 tests the capability of transceiver 10 to handle jitter in a reference clock signal by providing multiple variations of the reference clock signal 80A. To this extent, jitter can be referred to as variation of clock signal offset or duty cycle distortion. This is distinct from signal slurring tested under previous BIST devices, which relates to amplitude, rise time/fall time or similar characteristics of the actual network data signal. Specifically, slurring relates to the shape of the actual output. Conversely, jitter relates to the relative consistency of the transition, whatever the shape may be over time. Specifically, previous BIST devices fail to provide a way to manufacture or control jitter.

Figure 5:
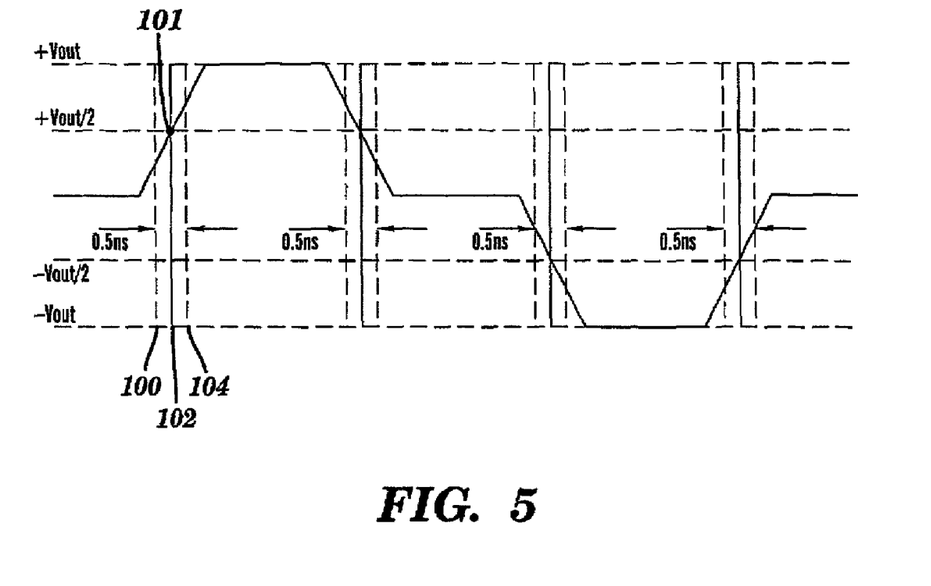
FIG. 5 depicts an example MLT3 data signal waveform as outputted by a transmitter.
Figure 6:
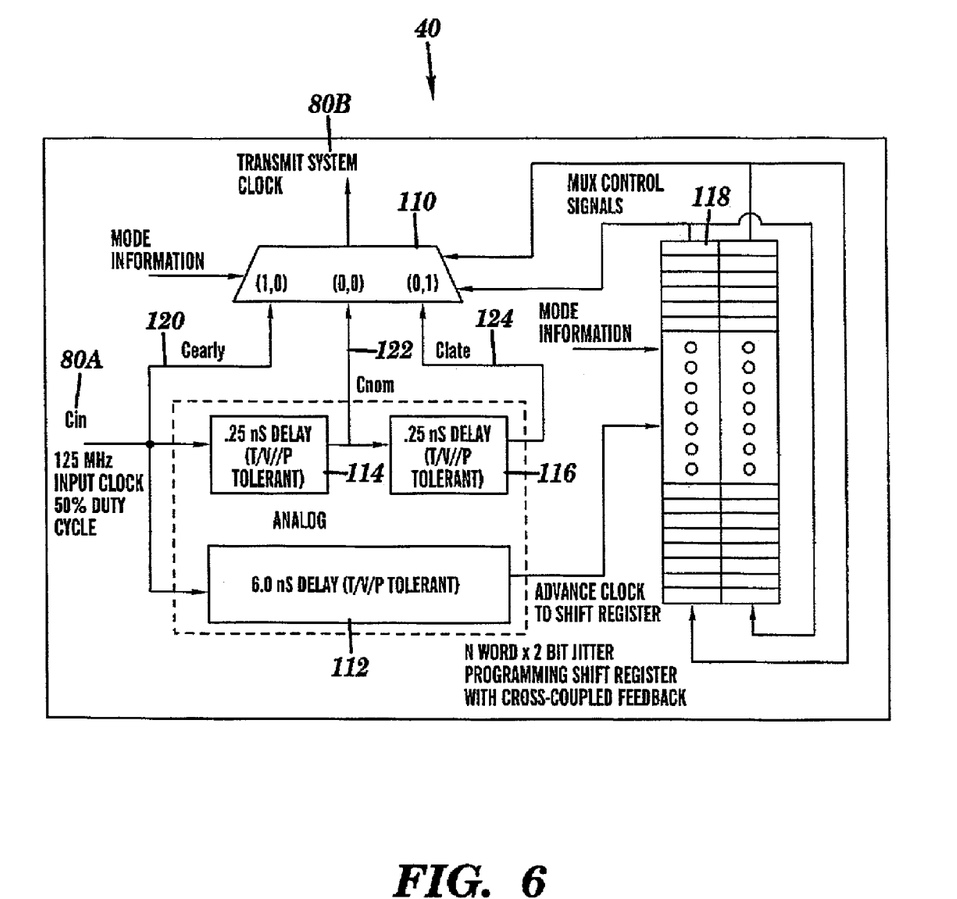
FIG. 6 depicts the jitter control system of the present invention.

Referring to FIG. 5, an example of an MLT3 data signal waveform outputted from transmitter 22 is shown in greater detail. In general, transition 101 depicted in FIG. 5 nominally occurs at time point 102. However, transition 101 may occur as early as point 100, or as late as time point 104. This resultant allowed variance is known as the allowed data jitter. In most transmitter designs, data signals are launched by a clock. Therefore, the allowed data jitter is typically proportional (in both direction and amount) to the reference clock jitter. Under the present invention, a known source for reference clock jitter is provided in order to generate data jitter as shown in FIG. 5. Specifically, jitter control system 40 (FIGS. 2 and 6) of the present invention provides such jitter by allowing an offset of the clock signal to be varied between early timing 100, nominal timing 102 and late timing 104. In comparison to FIG. 5, the timing of clock signal 80B can vary within a range of 0.5 ns, with −0.25 ns being early, 0.0 ns being nominal and 0.25 ns being late. It should be understood, however, that the range of 0.5 ns cited herein is for clarity purposes only, and that jitter could be tested for a wider or narrower time range. By providing multiple variations of the reference clock signal 80B (i.e., by varying the offset thereof), more in depth testing of transceiver is provided. Specifically, offset variation of the clock signal tests, among other things, the capability of transceiver 10 to recover the clock signal. Referring to FIG. 6, jitter control system 40 is shown in greater detail. As depicted, jitter control system 40 generally includes multiplexor 110, controller 112, delay timers 114 and 116 and N×M shift register 118. As will be further described below, multiplexor 110 controls the variation of clock signal 80B that is passed to transmitter BIST 20. Specifically, multiplexor 110 is controlled by both mode (functional/test mode) and phase information. Multiplexor 110 allows for selection of one of a multiplicity of phase shifted rising clock signal edges to operate transmitter 22, inclusive of transmitter BIST 20 on every cycle. Input to multiplexor 110 is sourced from incoming clock signal 80A and a temperature/process invariant tapped delay chain commonly known in the art, as controlled by a VCO or similar means. Multiplexor selectivity is provided by N×M shift register 118 wherein N is the number of words in the register and M is the number of bits needed to provide multiplexor 110 control. Shift register 118 is wired into M(N) bit shift strings with the output of one string feeding the input of another. The bits of shift register 118 are initialized during BIST device initialization, and shifted during the inactive period of all possible phase clocks, as provided by controller 112 (also controlled as process/temperature invariant). Wiring of shift register 118 would yield a repeat of multiplexor selection signature after 2N (i.e., every MN) clock cycles, effectively doubling the pattern period. Selection of the clock edge to use during each transmit bit time effectively mimics the offset shown in FIG. 5. As receiver BIST 14 is operating on recovered clocks and non-phase-shifted clocks, data incoming to receiver 28 appears to be jittering, providing extra stress and thus, test margin on the clock recovery system.

As shown in FIG. 6, incoming clock signal 80A is received by jitter control system 40 and is varied to yield clock signal 80B, which is then passed to logic counters 42 and 46 and pulse width counter 44. Specifically, as incoming clock signal 80A is received, it will be passed straight to multiplexor 110, as well as to delay timers 114 and 116 in the manner shown. By passing incoming clock signal 80A straight to multiplexor 110, an early clock signal 120 is created. That is, no delay has been imparted into the clock signal. Conversely, each delay timer 114 and 116 delays incoming clock signal 80A by 0.25 ns. Thus, by passing the clock signal 80A to delay timer 114, and then from delay timer 114 to multiplexor 110, a nominal clock signal 122 is created that lags early clock signal 120 (and incoming clock signal 80A) by 0.25 ns. Similarly, by passing incoming clock signal 80A through both delay timers 114 and 116 and then to multiplexor 110, the resulting late clock signal 124 lags clock signals 80A and 120 by 0.5 ns.

FIGS. 7A-D depict the relative relationships between the different type of clock signals described herein.

Figure 7A:
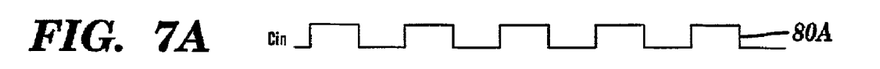
FIGS. 7A-7F depict example clock signal waveforms as provided by the jitter control system of FIG. 6.
Figure 7B:
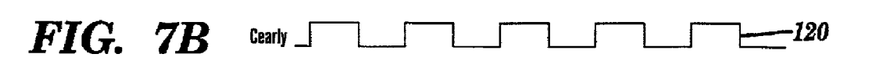
Figure 7C:
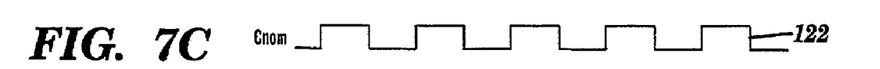
Figure 7D:
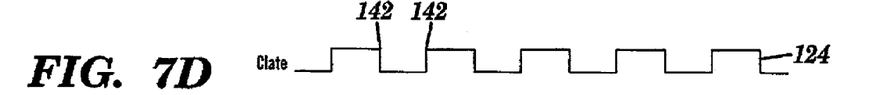

As shown, FIGS. 7A and 7B depict input clock signal 80A and early clock signal 120, respectively. Since, input clock signal 80A was routed directly to multiplexor 110 to yield the early clock signal 120, the waveforms are identical. Conversely, since nominal clock signal 122 was delayed by delay timer 114 before being passed to multiplexor 110, nominal clock signal 122 lags both input lock signal 80A and early clock signal 120. Similarly, because late clock signal 124 was delayed by both delay timers 114 and 116, late clock signal 124 lags all other clock signals 80A, 120 and 122. By varying the offset of the clock signal in this manner shown, jitter is created. It should be understood that a different quantity of delay timers could be implemented depending on the degree of offset desired. Moreover, each delay timer 114 and 116 could cause a delay other than the 0.25 ns shown.

The type of clock signal (e.g., early, nominal or late) that is passed to transmit BIST 20 as clock signal 80B will depend upon a signal received by multiplexor 110 from shift register 118. Specifically, a combination of "0's" and "1's" as received from shift register 118 will determine which of the three signals multiplexor 110 will transmit with "0,0" being early clock signal 120, "1,0" being nominal clock signal 122, and "0,1" being late clock signal 124. To this extent, shift register 118 can be preprogrammed so that the clock signals are varied in a particular order. For example, if clock signal 80B is to have three stages (e.g., early clock signal 120, then late clock signal 122, and then nominal clock signal 124), shift register 118 would control multiplexor 110 with the following signal: (1,0)-(0,1)-(0,0).

Figure 7E:
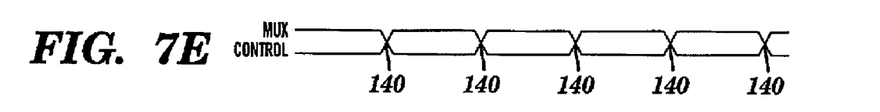

Controller 112 provides control of multiplexor 110 as well as updating of shift register 118. In the case of the former, controller 112 ensures that transitions between clock signals (e.g., early to late) will not occur during a rising or falling edge (e.g., 142 in FIG. 7E) of another clock signal type. For example, as shown in FIG. 7E, transition points 140 indicate when a control signal transition can occur. Such transition points 140 never occur during a rising or falling edge (e.g., 142 of FIG. 7F) of any type of clock signal. Specifically, transition points 140 lag all clock signals 80A, 120, 122 and 124. This guarantees that all multiplexor inputs will be the same so that no glitch occurs when the type of clock signal is changed. With respect to the updating of shift register 118, controller 112 allows updating of the input (e.g., "0's" and "1's") to multiplexor 110. This will determine whether the next rising edge of the clock signal waveform is early, nominal or late and effectively mimics movement in time of outgoing data. That is, the illusion of separation of clocking domains between transmitter 22 and receiver 28 is created.

Figure 7F:
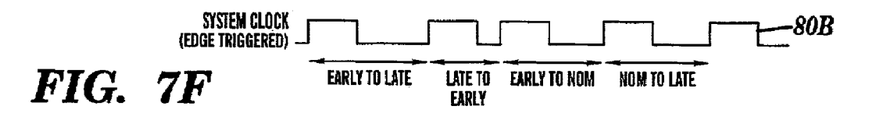

Referring now to FIG. 7F an example clock signal 80B under the present invention is depicted. As shown, clock signal 80B has four stages and three transitions Specifically, clock signal 80B is first early clock signal 120, then transitions to late clock signal 124, then transitions to nominal clock signal 122, and finally transitions to late clock signal 124. This variation of clock signal offset (i.e., jitter) provides improved testing as described above.

Referring back to FIGS. 1 and 2, the remaining portions of BIST device 38 will be described. In a preferred embodiment, logic counters 42 and 46 (as well as pulse width counter 44) receive clock signal 80B. Logic counters 42 and 46 are programmed to generate a network data signal 50 (i.e., a BIST signal) comprising a series of logic level "1's" and "0's" at the desired test frequency and duty cycle for input to the protocol generator and/or transmitter 22. Network data signal 50 can have pulse width and jitter characteristics as provided by jitter control system 40 and pulse width counter 44. It should be understood that use of the two independent programmable counter systems 42 and 46 and control logic circuitry 48 enables generation of a network data signal 50 that has reference clock signal 80B embedded therein. This signal 50 may be used for testing receiver 28 sensitivities such as long periods of inactivity which may test PLL, DC restore, or peak detect circuits, or high levels of activity which may test circuit response. In addition, if pulse width and/or clock signal offset has been varied as described above, more complex testing such as clock recovery capabilities can be tested. If scrambling is generally implemented in protocol generation, transmitter BIST 20 also operates to disable the scrambling and allow for the unscrambled data to be sent on the line.

For the receiver BIST 14, equalization and gain setting circuitry 60 is provided for generating signals 61 representing equalization and gain settings for input to receiver 28 and which are used to eliminate the convergence time for variable gain adaptation, thereby reducing the effective clock recovery PLL lock time during test. Particularly, receiver BIST 14 uses reference clock signal 80A (i.e., or some non-shifting form of system clock 80A) along with the received serial bitstream 76 from the receiver 28, a recovered clock signal 78, and PLL lock signal 79 from the receiver 28 to analyze receiver 28 function.

As shown in FIG. 1, a bi-directional bus 29 between receiver 28 and receiver BIST 14 includes signal lines enabling BIST receipt of serial bitstream 76, PLL lock indicator 79, and recovered clock signal 78, and further enabling communication of receiver equalization/gain settings to receiver 28 and transfer control gate signal to transfer gate 26. In operation, PLL lock signal 79 is input from receiver 28 indicating that the received clock signal has been locked. At the receipt of PLL locked signal 79, latch circuit 68 is set to enable four counter-monitoring systems within BIST 38. The first of these counter/monitoring systems is a reference counter system 62 including an enable circuit 64A and counter circuit 64B that is reset prior to BIST 38 start, and begins counting reference clock cycles 80A when the clock recovery system locks. This counter system 62 provides a sampling window of known value and is programmable so as to provide window tailoring. Particularly, the counter output of the reference counter 64B is input to a counter enable logic circuit 66, which generates an enable signal 67 for enabling counter/monitoring operation of the counter/monitoring systems for the predetermined window of time. The second counter/monitoring system comprises a PLL lock monitor circuit 70 responsive to the enable 67 signal for monitoring the PLL lock signal 79 and ensuring that once locked, the PLL does not unlock during the duration of the test as defined by the reference counter system 62. The PLL lock monitor circuit is also capable of providing readout in cases where the PLL did not lock initially. The third counter/monitoring system comprises a recovered data counter circuit 72 enabling frequency measurement of the recovered data signal 76 as data is transmitted as a periodic signal. The recovered data counter circuit 72 particularly provides a transition count during the defined reference counter window. The fourth counter/monitoring system comprises a recovered clock counter circuit 74 for measuring the number of transitions of the recovered clock signal 78 during the reference counter window. As indicated above, data signal and clock signal can have varied pulse width and/or offset variation, respectively, under the present invention. These features test among other things, transceiver's 10 capability for recovering the clock signal 80A.

As shown in FIG. 1, when BIST device 38 is initially started, a periodic network data signal is broadcast from transmitter 22 in conjunction with external passive devices 24 as connected by transmitter output 25, for receipt by receiver 28. The voltage developed at output 25 appears across the connection between transfer gate 26 and transmitter 22, which is a second branch off output 25. The voltage waveform is gated by transfer gate 26 and allowed to propagate to receiver 28 via connection 31 between transfer gate 26 and receiver 28. It should be understood that lines 31 and 33 converge inside receiver 28, however, line 31, the functional input, is left unconnected in test mode. Once the data is received and successfully locked, the four counter systems 62, 70, 72 and 78 are enabled. The second, third, and fourth system counter transitions on key receiver outputs while the reference counter is less than the programmed maximum value and disregards transitions outside this time window. The reference clock 80B of transceiver 10 and BIST device 38 run long enough to allow the specified lock time for the PLL, measurement time as defined by the reference window, and a time buffer; but it should be understood that the actual number of cycles is not critical as long as the window is sufficiently large so as to minimize the uncertainty caused by the exclusion of the least significant bit(s) in the result comparison. Once the number of functional cycles is completed, transceiver 10 may be returned to LSSD mode, and the contents of BIST device 38 may be scanned and checked. The contents of the reference counter 64B may be used to ensure that the time period between PLL lock and test termination was sufficient to complete the window, and also verifies the upper bound of the lock time for the PLL since only a predetermined number of reference clock cycles are allotted to occur in the test. The lock monitor contents verify that the PLL initially locked, and that it did not unlock during the reference window. The recovered data counter 72 may be checked to ensure that the proper number of transitions, as calculated by the data frequency rate and the reference window width minus some least significant bit uncertainty due to the asynchronous nature of the reference clock to recovered data, was found. The recovered clock counter 74 may be checked to ensure that a proper number of recovered clock pulses as calculated by the expected mean frequency of the recovered clock and reference window minus some LSB uncertainty for the asynchronous nature of the clocks, was found. As the system is self timing, no external data collection and post processing is required in the system. Additionally, the system provides a level of AC performance testing of the driver not previously accomplished via on-chip test assists.

In order to eliminate the need for cable-induced signal attenuation, a test-specific transmitter 22 is provided as shown in FIG. 1 that is capable of transmitting data in a format identical to the functional transmitter, but with lower peak-to-peak signal swings to approximate the attenuation of a specified length of cable. Particularly, the following additional circuitry is present in the transmitter BIST 20 of FIG. 2: a programmable signal strength control circuit 52 providing control signals 58 for controlling transmit driver circuits of transmitter 22 to provide output transmitter signals of varying strengths; and, a programmable slurring control circuit 54 providing control signals 56 for controlling transmitter drivers capable of distorting the analog transmitter signal output, as will be herein described. Each of these circuits and the additional provision of equalization/ gain setting control enables full multiple signal strength corners testing without external cabling or relays. The test-specific driver (not shown) may be implemented using a subset of fingers of the functional driver, or may comprise one or more separate drivers in order to provide additional test corner granularity. If multiple protocols are supported within the driver, multiple protocol test-specific drivers may also be implemented.

Figure 8:
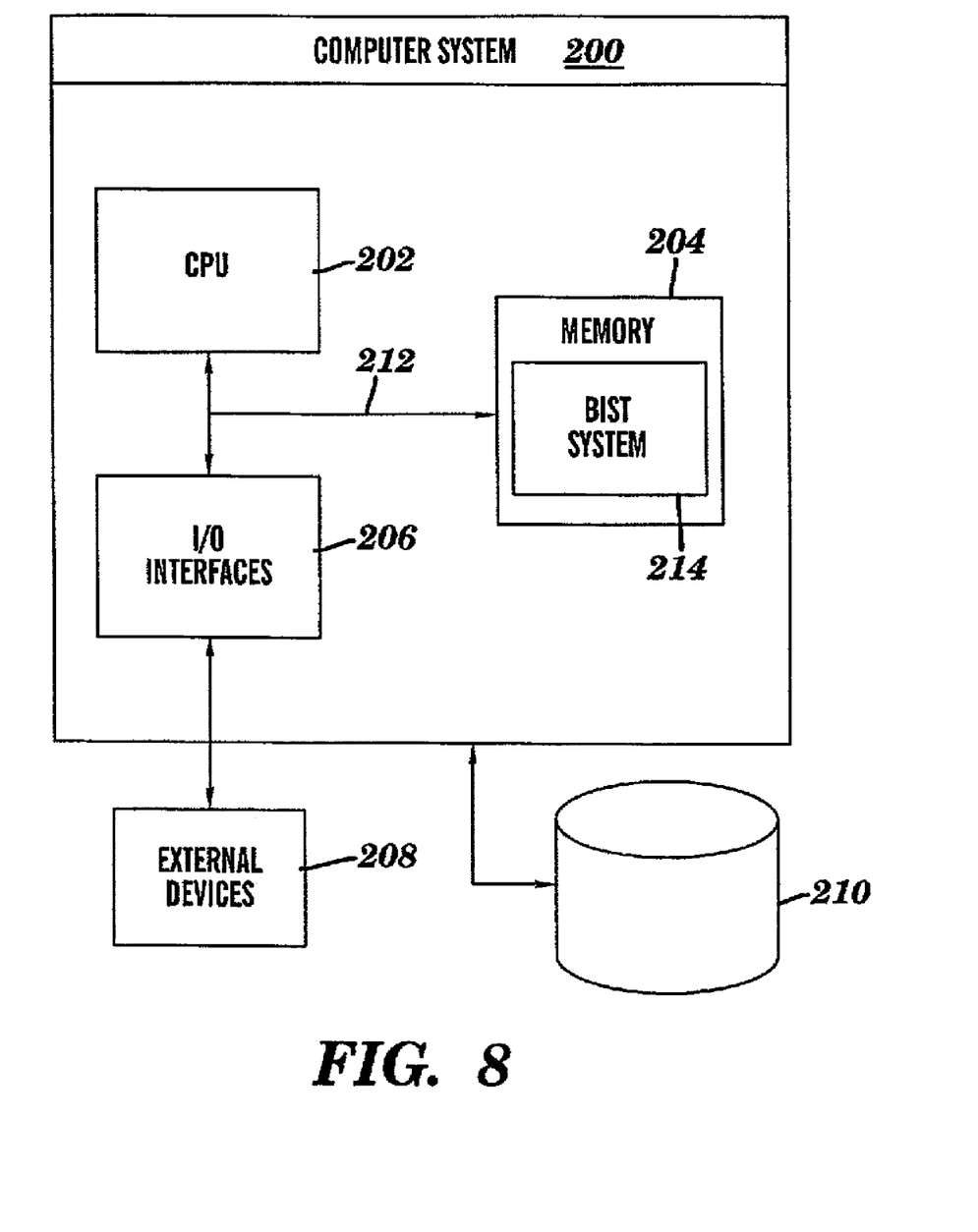
FIG. 8 depicts a program product implementation of the present invention.

Referring now to FIG. 8 a computer system 200/program product 214 implementation of the present invention is shown. As depicted, computer system 200 generally comprises a central processing unit (CPU) 202, memory 204, input/output (I/O) interfaces 206, external devices/resources 208, database 210, and bus 212. Memory 204 may comprise any known type of data storage and/or transmission media, including magnetic media, optical media, random access memory (RAM), read-only memory (ROM), a data cache, a data object, etc. Moreover, memory 204 may reside at a single physical location, comprising one or more types of data storage, or be distributed across a plurality of physical systems in various forms. CPU 202 may likewise comprise a single processing unit, or be distributed across one or more processing units in one or more locations, e.g., on a client and server.

I/O interfaces 206 may comprise any system for exchanging information from an external source. External devices 208 may comprise any known type of external device, including speakers, a CRT, LED screen, hand-held device, keyboard, mouse, voice recognition system, speech output system, printer, monitor, facsimile, pager, etc. It should be understood that the embodiment of computer system 10 shown in FIG. 8 is typically representative of a personal computer or the like, and is shown for clarity purposes only. Bus 212 provides a communication link between each of the components in the computer system 200 and likewise may comprise any known type of transmission link, including electrical, optical, wireless, etc. In addition, although not shown, additional components, such as cache memory, communication systems, system software, etc., may be incorporated into computer system 200.

Database 210 could provides storage for information necessary to carry out the present invention. Such information could include, inter alia, shift register 118 programming information. Database 210 may include one or more storage devices, such as a magnetic disk drive or an optical disk drive. In another embodiment database 210 includes data distributed across, for example, a local area network (LAN), wide area network (WAN) or a storage area network (SAN) (not shown). Database 210 may also be configured in such a way that one of ordinary skill in the art may interpret it to include one or more storage devices. Moreover, it should be understood that database 210 could alternatively exist within computer system 10.

Stored in memory 204 is BIST system 214. BIST system 214 is a program product having program code for carrying out the present invention as describe above. Specifically, BIST system 214 should have program code for, among other things: (1) generating a network data signal and a control signal; (2) generating a reference clock signal; (3) varying a pulse density/width of the network data signal; (4) varying an offset of the reference clock signal; (5) passing the generated network data signal and control signal to a transmitter; (6) generating an output signal based upon the network data signal and the control signal, and passing the output signal to a receiver; (7) reconstructing the network data signal; and (8) detecting erroneous performance based upon the reconstructed network data signal.

It is understood that the present invention can be realized in hardware, software, or a combination of hardware and software. Moreover, computer system 200 according to the present invention can be realized in a centralized fashion in a single computerized system, or in a distributed fashion where different elements are spread across several interconnected systems. Any kind of computer system(s)—or other apparatus adapted for carrying out the methods described herein—is suited. A typical combination of hardware and software could be a general purpose computer system with a computer program that, when loaded and executed, controls computer system 200 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A transceiver for receiving and transmitting data over a network, comprising:

a transmitter for receiving a network data signal representative of a signal capable of being transmitted over a network and a control signal for impairing characteristics of the network data signal, and for continuously generating an output signal corresponding to the data signal and the control signal during a predetermined time window;

a receiver for continuously receiving the output signal from the transmitter, and for reconstructing the network data signal within the predetermined time window; and a built-in-self-test (BIST) device for generating the network data signal and the control signal, and for providing a reference clock signal with a varied offset for jitter testing the transceiver, wherein the BIST device detects erroneous performance by the transceiver based on the reconstructed network data signal;

wherein the BIST device includes a jitter control system comprising:

a multiplexor for outputting the reference clock signal;

at least one delay timer for delaying an input clock signal;

a shift register for controlling the multiplexor; and a controller for controlling the multiplexor and updating the shift register.

2. The transceiver of claim 1, wherein the control signal includes signals for impairing a phase and an amplitude of the network data signal.

3. The transceiver of claim 1, wherein the jitter control system varies an offset of the reference clock signal.

4. The transceiver of claim 1, wherein the BIST device further comprises a pulse width counter for varying a pulse width of the network data signal.

5. The transceiver of claim 4, wherein the pulse width counter tests a clock recovery capability of the receiver.

6. A transceiver for receiving and transmitting data over a network, comprising:

a transmitter for receiving a network data signal representative of a signal capable of being transmitted over a network and a control signal for impairing characteristics of the network data signal, and for continuously generating an output signal corresponding to the data signal and the control signal during a predetermined time window;

a receiver for continuously receiving the output signal from the transmitter, and for reconstructing the network data signal within the predetermined time window; and a built-in-self-test (BIST) device for generating the network data signal and the control signal, and for varying a pulse width of the network data signal and for varying an offset of a reference clock signal embedded within the network data signal, wherein the BIST device comprises means for detecting erroneous performance by the transceiver based on the reconstructed network data signal and the BIST device includes a jitter control system comprising:
- a multiplexor for outputting the reference clock signal;
- at least one delay timer for delaying an input clock signal;
- a shift register for controlling the multiplexor; and
- a controller for controlling the multiplexor and updating the shift register.

7. The transceiver of claim 6, wherein the control signal includes signals for impairing a phase and an amplitude of the network data signal.

8. The transceiver of claim 6, wherein the BIST device comprises means for programming the network data signals.

9. The transceiver of claim 6, wherein the transmitter and the receiver are provided on a single integrated circuit, the transceiver further comprising a transfer gate for selectively coupling the output signal from the transmitter to the receiver within the integrated circuit.

10. The transceiver of claim 6, wherein the network data signal includes an embedded reference clock signal, and wherein the BIST device comprises means for locking onto the embedded reference clock signal.

11. The transceiver of claim 10, wherein the means for detecting erroneous performance by the transceiver comprises a counter device for counting edge transitions of the reference clock signal for establishing a time window for reconstructing the network data signal data recovered from the output signal.

12. The transceiver of claim 11, wherein the means for detecting erroneous performance by the transceiver further comprises a counter device for counting edge transitions of the network data signal within the established time window.

13. A method for testing performance of a transceiver for receiving and transmitting data over a network, comprising the steps of:
- generating a network data signal representative of signals capable of being transmitted over a network, and generating a control signal for impairing characteristics of the network data signal;
- varying a pulse width of the network data signal;
- varying an offset of a reference clock signal embedded within the network data signal;
- a transmitter component of the transceiver device receiving the network data signal and the control signal and generating an output signal corresponding to the network data signal and having an impaired characteristic according to the control signal, the output signal being generated continuously during a predetermined time window;
- a receiver component of the transceiver device continuously receiving the output signal from the transmitter component and reconstructing the network data signal within the predetermined time window; and
- detecting erroneous performance by the transceiver based on the reconstructed data signal;

wherein the offset varying includes:
- outputting a reference clock signal embedded within the network data signal;
- delaying an input clock signal; and
- controlling the reference clock signal outputting.

14. The method of claim 13, wherein the step of reconstructing the network data signal comprises counting edge transitions of the embedded reference clock signal to establish the predetermined time window.

15. The method of claim 13, wherein the step of reconstructing the network data signal comprises counting edge transitions of the network data signal within the predetermined time window.

16. A program product stored on a recordable medium for testing a transceiver device, which when executed, comprises:
- program code for generating a network data signal representative of data capable of being transmitted over a network by a transceiver device and for generating a control signal for impairing characteristics of the network data signal;
- program code for varying a pulse width of the network data signal;
- program code for varying an offset of a reference clock signal embedded within the network data signal;
- program code for enabling a transmitter component of the transceiver device to receive said network data signal and the control signal, and for generating an output signal corresponding to the network data signal having an impaired characteristic according to the control signal, wherein the output signal is generated continuously during a predetermined time window;
- program code for enabling a receiver component of the transceiver device to continuously receive the output signal from the transmitter component and for reconstructing the network data signal within the predetermined time window; and
- program code for detecting erroneous performance by the transceiver device based on the reconstructed network data signal;

wherein the offset varying program code controls a jitter control system comprising:
- a multiplexor for outputting the reference clock signal;
- at least one delay timer for delaying an input clock signal;
- a shift register for controlling the multiplexor; and
- a controller for controlling the multiplexor and updating the shift register.

17. The program product of claim 16, wherein the program code for reconstructing the network data signal comprises program code for counting edge transitions of the embedded reference clock signal to establish the predetermined time window.

18. The program product of claim 16, the program code for reconstructing the network data signal comprises program code for counting edge transitions of the network data signal within the predetermined time window.

* * * * *